US012548490B2

United States Patent
Akyol et al.

(10) Patent No.: US 12,548,490 B2
(45) Date of Patent: Feb. 10, 2026

(54) DISPLAY PANEL VOLTAGE PROTECTION SCHEME

(71) Applicant: Apple Inc., Cupertino, CA (US)

(72) Inventors: Hasan Akyol, Los Altos, CA (US); Henry C Jen, Los Altos, CA (US); Stanley B Wang, Cupertino, CA (US); Baris Cagdaser, Sunnyvale, CA (US); Rahul Shukla, Cupertino, CA (US); John T Wetherell, San Jose, CA (US); Bin Huang, San Jose, CA (US); Derek K Shaeffer, Redwood City, CA (US); Pablo Moreno Galbis, Burlingame, CA (US); Johan L Piper, Cupertino, CA (US); Lawrence C Tan, Mountain View, CA (US); Adam Adjiwibawa, Cupertino, CA (US); Manu Mishra, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/660,166

(22) Filed: May 9, 2024

(65) Prior Publication Data

US 2024/0420615 A1 Dec. 19, 2024

Related U.S. Application Data

(60) Provisional application No. 63/521,603, filed on Jun. 16, 2023.

(51) Int. Cl.
*G09G 3/20* (2006.01)

(52) U.S. Cl.
CPC ... *G09G 3/2092* (2013.01); *G09G 2300/0814* (2013.01); *G09G 2330/021* (2013.01); *G09G 2330/028* (2013.01)

(58) Field of Classification Search
CPC ......... G09G 3/2092; G09G 2300/0814; G09G 2330/021; G09G 2330/028; G09G 3/20; G09G 3/3696
See application file for complete search history.

(56) References Cited

U.S. PATENT DOCUMENTS 7,274,114 B1 * 9/2007 Wong ........................ G05F 1/56 307/72
8,581,568 B2 11/2013 Liang et al.
9,377,798 B2 6/2016 Bhattad
(Continued)

*Primary Examiner* — Jose R Soto Lopez
(74) *Attorney, Agent, or Firm* — Fletcher Yoder, P.C.

(57) ABSTRACT

An electronic device may include a display panel and a display driver. The display panel may include multiple pixels each receiving a supply voltage and a respective data voltage to emit light. The display driver may include a low drop-out regulator (LDO) to provide the supply voltage to the pixels. The LDO may operate in a normal operation mode and a hard park mode. In the normal operation mode, the LDO may generate the supply voltage based on receiving a reference voltage and a bias voltage within a bias voltage range to operate in the normal operation mode. In the hard park mode, the LDO may become idle (e.g., shut-down mode) based on receiving a hard park mode voltages from dedicated replacement circuits. For example, including the dedicated reference voltage replacement circuit with the display driver may improve reliability and efficiency of the electronic device when de-energizing the LDO.

20 Claims, 6 Drawing Sheets

(56) References Cited

U.S. PATENT DOCUMENTS

| | | | | |
|---|---|---|---|---|
| 10,121,410 | B2 | 11/2018 | Zheng et al. | |
| 10,902,777 | B1 | 1/2021 | Huang et al. | |
| 10,915,122 | B2 * | 2/2021 | Tan | G05F 1/10 |
| 10,990,221 | B2 | 4/2021 | Krah | |
| 10,996,283 | B2 | 5/2021 | Menon et al. | |
| 11,397,444 | B2 | 7/2022 | Manohar et al. | |
| 11,538,387 | B1 * | 12/2022 | Lee | G09G 3/20 |
| 2010/0079439 | A1 | 4/2010 | Bar et al. | |
| 2018/0188795 | A1 * | 7/2018 | Yang | G09G 3/2096 |
| 2018/0198416 | A1 * | 7/2018 | Hur | H03F 3/2171 |
| 2019/0097637 | A1 * | 3/2019 | Hutton | H03L 7/08 |
| 2021/0193056 | A1 * | 6/2021 | Piao | G09G 3/3291 |
| 2022/0094256 | A1 * | 3/2022 | Radhakrishnan | H02M 3/07 |
| 2023/0359854 | A1 * | 11/2023 | Chen | G06K 19/07707 |
| 2024/0275391 | A1 * | 8/2024 | Venerus | H04L 27/2082 |
| 2024/0291934 | A1 * | 8/2024 | Yao | G06F 3/1446 |

* cited by examiner

DISPLAY PANEL VOLTAGE PROTECTION SCHEME

CROSS-REFERENCE TO RELATED APPLICATIONS

This application claims priority to U.S. Provisional Application No. 63/521,603, filed Jun. 16, 2023, entitled "DISPLAY PANEL VOLTAGE PROTECTION SCHEME," the disclosure of which is incorporated by reference in its entirety.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

A display circuit may include a display driver and a display panel. The display panel may include multiple display pixels and the display driver may include pixel driving circuits. The display driver may include bias voltage generator circuitry to generate a bias voltage and a reference voltage circuitry to generate a reference voltage. The display driver may include a low drop-out (LDO) to output a pixel voltage based on inputting the bias voltage and the reference voltage. The display driver may also include a comparator circuit to generate commands based on determining that a rapid and/or potentially deleterious change has occurred in the pixel voltage, an internal or external circuit reset command is received, among other things. The display driver may also include bias voltage generator replacement circuitry to generate a replacement bias voltage and a reference voltage replacement circuitry to generate a replacement reference voltage. For example, the bias voltage generator replacement circuitry and the reference voltage replacement circuitry may include hardened circuitry to provide stable voltages and/or currents.

A multiplexer of the display driver may receive the commands to provide the replacement bias voltage and the replacement reference voltage instead of the bias voltage and the reference voltage to the LDO. The replacement bias voltage and the replacement reference voltage may include stable (e.g., fixed) voltage that may reduce an effect of the rapid and/or potentially deleterious change in the circuit and/or circuit voltages mentioned above. Accordingly, the operations of the display driver may be improved by reducing possible rapid and/or potentially deleterious changes of the LDO, the pixels, among other circuitry.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Furthermore, the phrase A "based on" B is intended to mean that A is at least partially based on B. Moreover, the term "or" is intended to be inclusive (e.g., logical OR) and not exclusive (e.g., logical XOR). In other words, the phrase A "or" B is intended to mean A, B, or both A and B.

Figure 1:
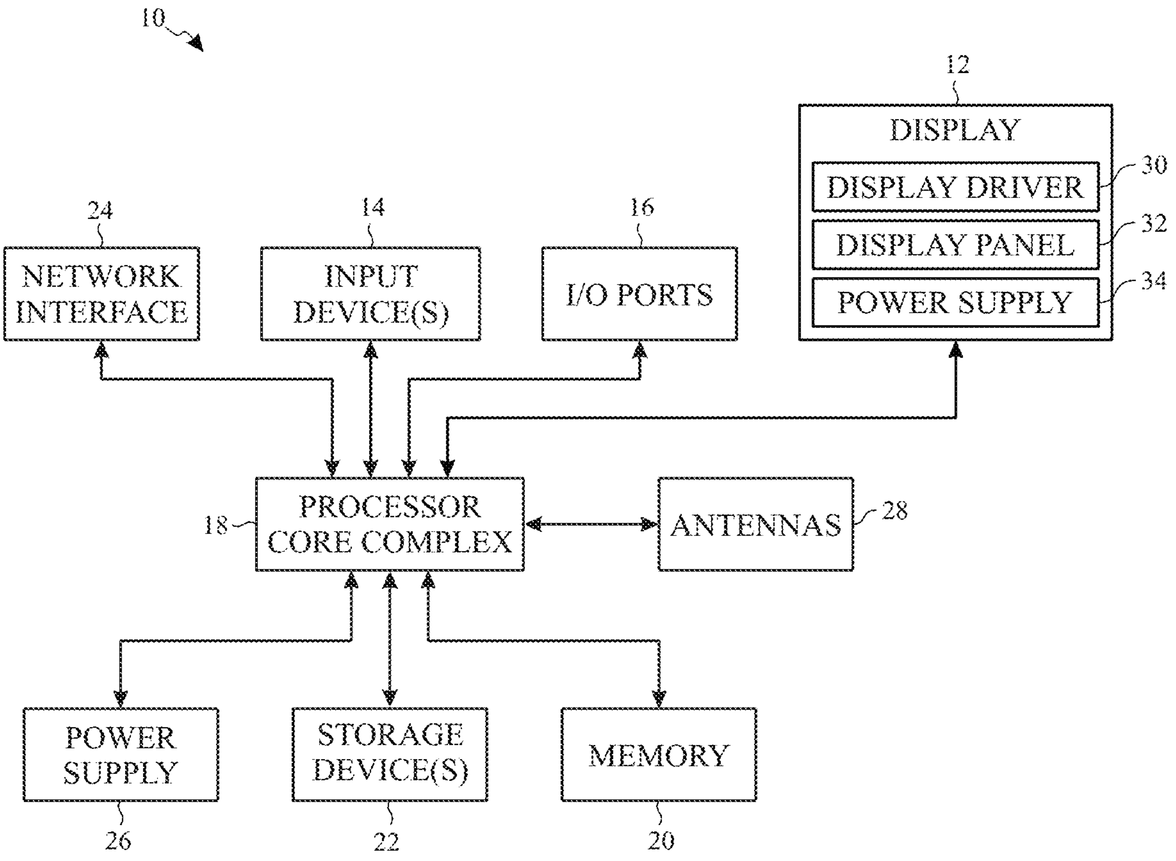
FIG. 1 is a block diagram of an electronic device with an electronic display, according to embodiments of the present disclosure.

An electronic device 10 including an electronic display 12 is shown in FIG. 1. As is described in more detail below, the electronic device 10 may be any suitable electronic device, such as a computer, a mobile phone, a portable media device, a tablet, a television, a virtual-reality headset, a wearable device such as a watch, a vehicle dashboard, or the like. Thus, it should be noted that FIG. 1 is merely one example of a particular implementation and is intended to illustrate the types of components that may be present in an electronic device 10.

The electronic device 10 includes the electronic display 12, one or more input devices 14, one or more input/output (I/O) ports 16, a processor core complex 18 having one or more processing circuitry(s) or processing circuitry cores, local memory 20, a main memory storage device 22, a network interface 24, a power source 26 (e.g., power supply), and one or more antennas 28. The various components described in FIG. 1 may include hardware elements (e.g., circuitry), software elements (e.g., a tangible, non-transitory computer-readable medium storing executable instructions), or a combination of both hardware and software elements. It should be noted that the various depicted components may be combined into fewer components or separated into additional components. For example, the local memory 20 and the main memory storage device 22 may be included in a single component.

The processor core complex 18 is operably coupled with local memory 20 and the main memory storage device 22. Thus, the processor core complex 18 may execute instructions stored in local memory 20 and/or the main memory storage device 22 to perform operations, such as generating or transmitting image data to display on the electronic display 12. As such, the processor core complex 18 may include one or more general purpose microprocessors, one or more application specific integrated circuits (ASICs), one or more field programmable logic arrays (FPGAs), or any combination thereof.

In addition to program instructions, the local memory 20 or the main memory storage device 22 may store data to be processed by the processor core complex 18. Thus, the local memory 20 and/or the main memory storage device 22 may include one or more tangible, non-transitory, computer-readable media. For example, the local memory 20 may include random access memory (RAM) and the main memory storage device 22 may include read-only memory (ROM), rewritable non-volatile memory such as flash memory, hard drives, optical discs, or the like.

The network interface 24 may communicate data with another electronic device or a network. For example, the network interface 24 (e.g., a radio frequency system) may enable the electronic device 10 to communicatively couple to a personal area network (PAN), such as a Bluetooth network, a local area network (LAN), such as an 802.11x Wi-Fi network, or a wide area network (WAN), such as a 4G, Long-Term Evolution (LTE), or 5G cellular network. The power source 26 may provide electrical power to one or more components in the electronic device 10, such as the processor core complex 18 or the electronic display 12. Thus, the power source 26 may include any suitable source of energy, such as a rechargeable lithium polymer (Li-poly) battery or an alternating current (AC) power converter. The I/O ports 16 may enable the electronic device 10 to interface with other electronic devices. For example, when a portable storage device is connected, the I/O port 16 may enable the processor core complex 18 to communicate data with the portable storage device.

The input devices 14 may enable user interaction with the electronic device 10, for example, by receiving user inputs via a button, a keyboard, a mouse, a trackpad, or the like. The input device 14 may include touch-sensing components in the electronic display 12. The touch sensing components may receive user inputs by detecting occurrence or position of an object touching the surface of the electronic display 12.

The electronic display 12 may include driver circuitry 30 (e.g., display driver circuitry), a display panel 32, and power supply circuitry 34 with a number of independent supply tiles. The display panel 32 may include pixel circuitry with an array of display pixels. In some embodiments, the power source 26 may include or be coupled to the power supply circuitry 34. Moreover, the driver circuitry 30 may include various circuitry to provide one or more stable positive and/or negative supply voltages, such as an Electrical-Luminescent Voltage Supply System (ELVSS) voltage, (e.g., negative emission rail), to the display panel 32 based on receiving input voltage(s) (e.g., one or more positive and/or negative supply voltages) from the power supply circuitry 34. For example, the driver circuitry 30 may include a first Low Drop-Out (LDO) voltage regulator circuit to generate a stable positive supply voltage based on receiving the input voltages (e.g., the positive supply voltages). Moreover, the driver circuitry 30 may include a second LDO voltage regulator circuit to generate a stable negative supply voltage based on receiving the input voltages (e.g., the negative supply voltages), as will be appreciated.

The electronic display 12 may control light emission of the display pixels based on receiving the supply voltages. The electronic display 12 may control light emission of the display pixels to provide visual representations of information, such as a graphical user interface (GUI) of an operating system, an application interface, a still image, or video content, by displaying frames of image data. To display images, the electronic display 12 may include display pixels implemented on the display panel. The display pixels may represent sub-pixels that each control a luminance value of one color component (e.g., red, green, or blue for an RGB pixel arrangement or red, green, blue, or white for an RGBW arrangement).

The electronic display 12 may display an image by controlling light emission from its display pixels based on image data associated with corresponding display pixels in the image. In some embodiments, image data may be generated by an image source, such as the processor core complex 18, a graphics processing unit (GPU), or an image sensor. Additionally, in some embodiments, image data may be received from another electronic device 10, for example, via the network interface 24 and/or an I/O port 16. Similarly, the electronic display 12 may display frames based on image data generated by the processor core complex 18, or the electronic display 12 may display frames based on image data received via the network interface 24, an input device, or an I/O port 16.

Figure 2:
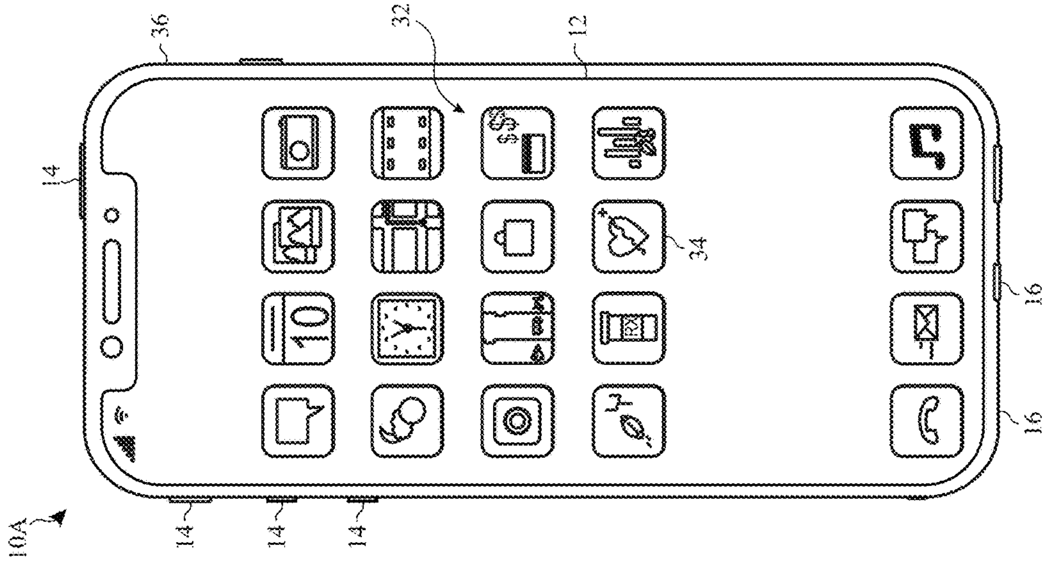
FIG. 2 is a front view of a handheld device representing an example of the electronic device of FIG. 1, according to embodiments of the present disclosure.

The electronic device 10 may also have the one or more antennas 28 electrically coupled to the processor core complex 18. The electronic device 10 may be any suitable electronic device. To help illustrate, an example of the electronic device 10, a handheld device 10A, is shown in FIG. 2. The handheld device 10A may be a portable phone, a media player, a personal data organizer, a handheld game platform, or the like. For illustrative purposes, the handheld device 10A may be a smart phone, such as any IPHONE® model available from Apple Inc.

The handheld device 10A includes an enclosure 36 (e.g., housing). The enclosure 36 may protect interior components from physical damage or shield them from electromagnetic interference, such as by surrounding the electronic display 12. The electronic display 12 may display a graphical user interface (GUI) 38 having an array of icons. When an icon 40 is selected either by an input device 14 or a touch-sensing component of the electronic display 12, an application program may launch.

The input devices 14 may be accessed through openings in the enclosure 36. The input devices 14 may enable a user to interact with the handheld device 10A. For example, the input devices 14 may enable the user to activate or deactivate the handheld device 10A, navigate a user interface to a home screen, navigate a user interface to a user-configurable application screen, activate a voice-recognition feature, provide volume control, or toggle between vibrate and ring modes.

Figure 3:
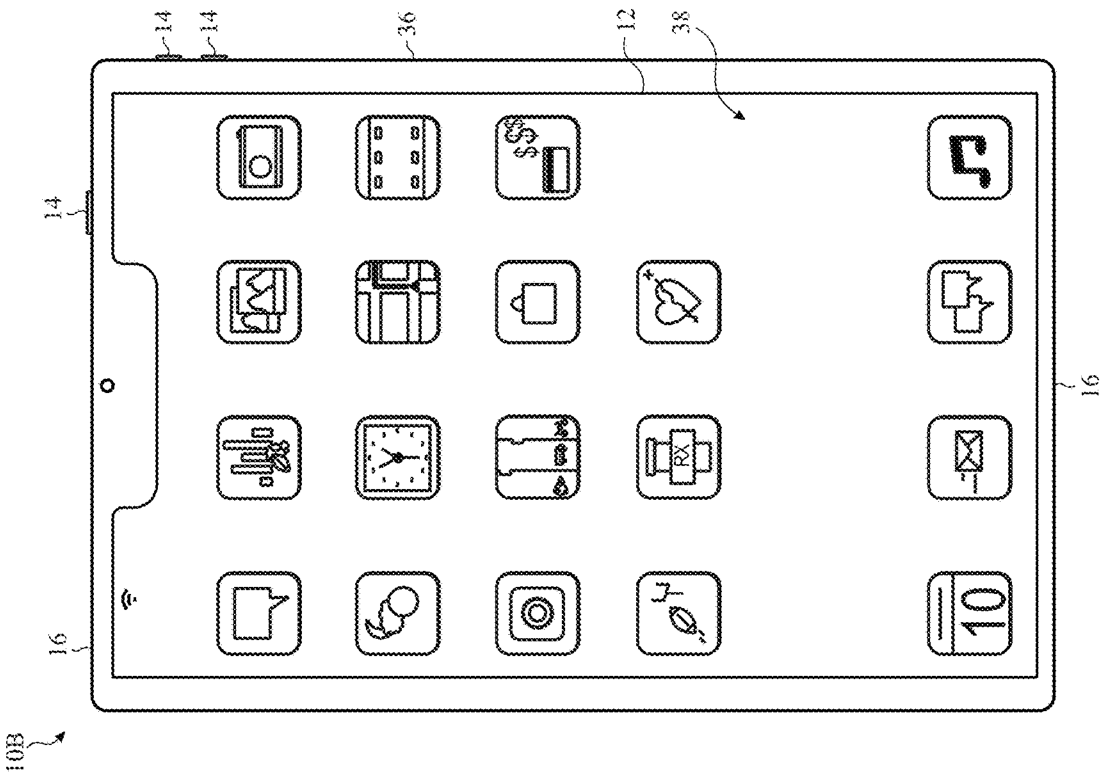
FIG. 3 is a front view of another handheld device representing another example of the electronic device of FIG. 1, according to embodiments of the present disclosure.
Figure 4:
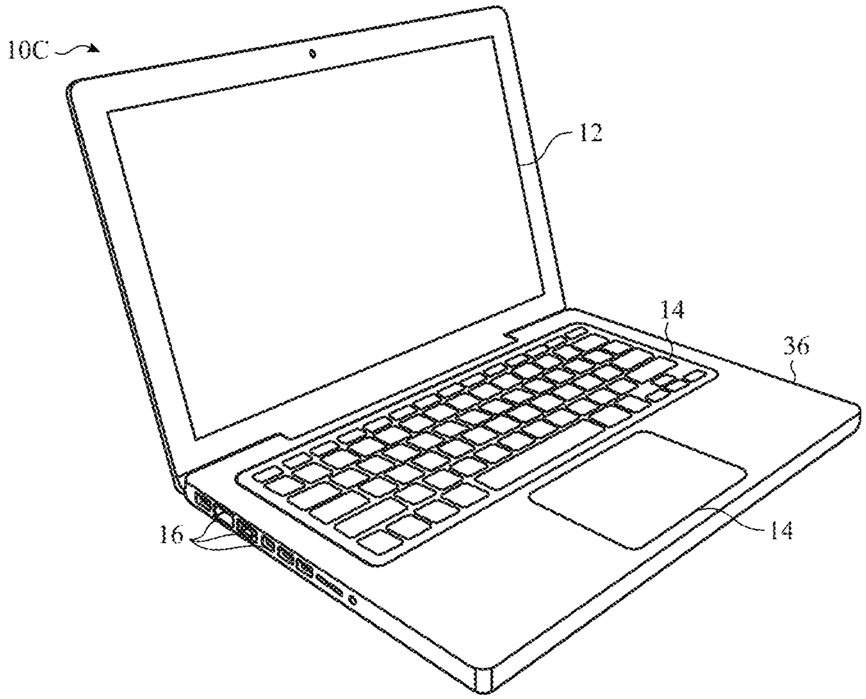
FIG. 4 is a perspective view of a notebook computer representing an example of the electronic device of FIG. 1, according to embodiments of the present disclosure.
Figure 5:
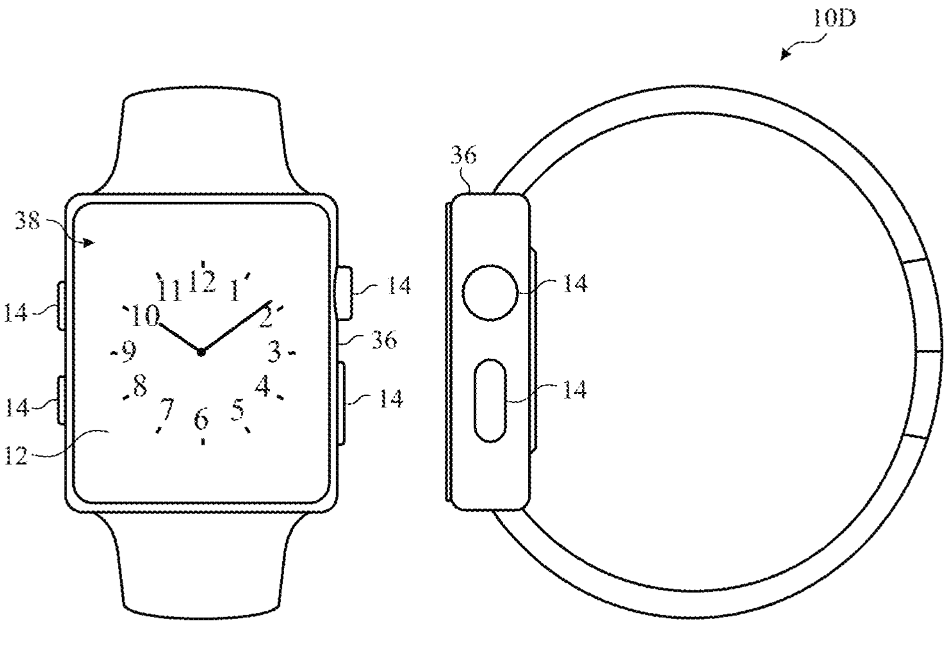
FIG. 5 illustrates front and side views of a wearable electronic device representing another example of the electronic device of FIG. 1, according to embodiments of the present disclosure.

Another example of a suitable electronic device 10, specifically a tablet device 10B, is shown in FIG. 3. The tablet device 10B may be any IPAD® model available from Apple Inc. A further example of a suitable electronic device 10, specifically a computer 10C, is shown in FIG. 4. For illustrative purposes, the computer 10C may be any MACBOOK® or IMAC® model available from Apple Inc. Another example of a suitable electronic device 10, specifically a watch 10D, is shown in FIG. 5. For illustrative purposes, the watch 10D may be any APPLE WATCH® model available from Apple Inc.

As depicted, the tablet device 10B, the computer 10C, and the watch 10D each also includes an electronic display 12, input devices 14, I/O ports 16, and an enclosure 36. The electronic display 12 may display a GUI 38. Here, the GUI 38 shows a visualization of a clock. When the visualization is selected either by the input device 14 or a touch-sensing component of the electronic display 12, an application program may launch, such as to transition the GUI 38 to presenting the icons 40 discussed with respect to FIGS. 2 and 3.

Figure 6:
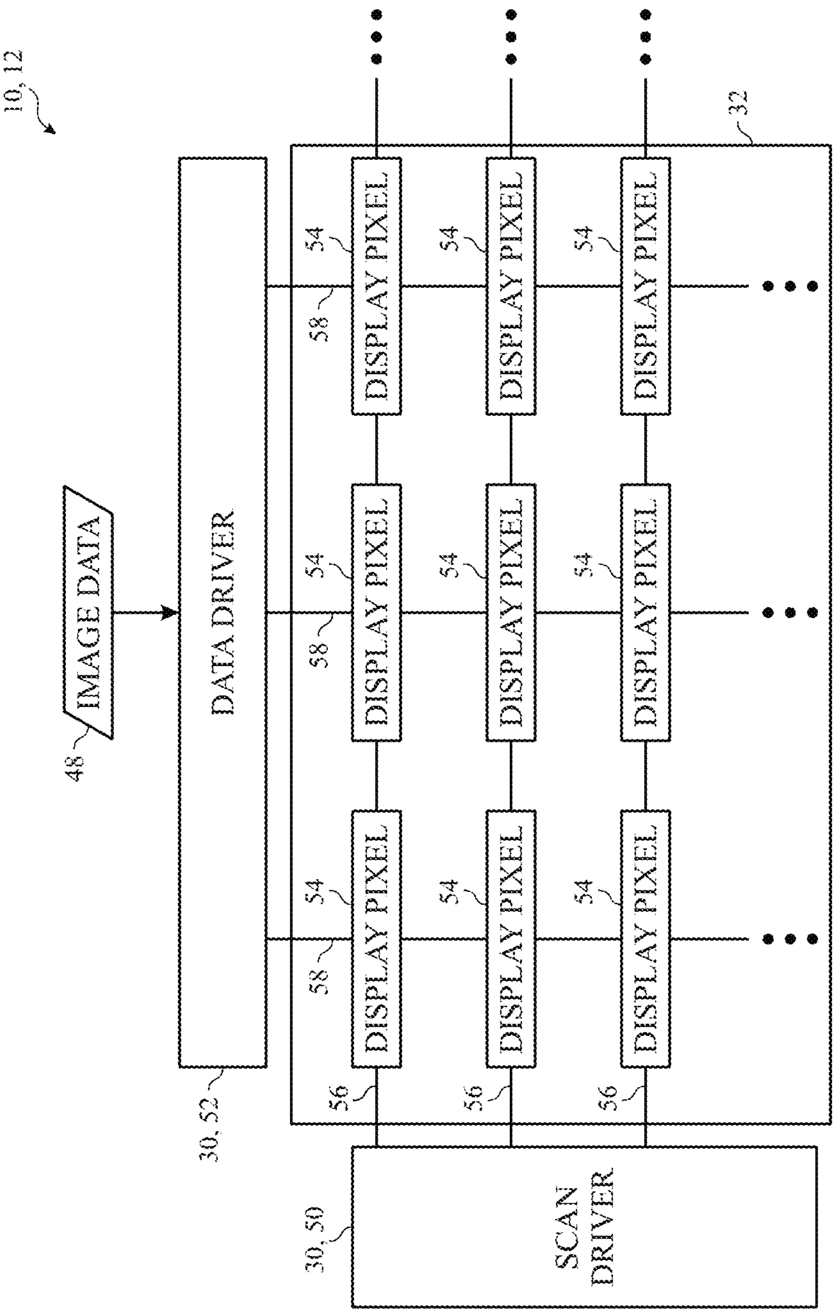
FIG. 6 is a block diagram of display driver circuitry and display panel of the electronic devices of FIGS. 1-5, according to embodiments of the present disclosure.

In FIG. 6, pixel circuitry of the display panel 32 associated with the electronic display 12 of the electronic device 10 is shown as an electronic display 12. The electronic display 12 may represent a liquid crystal display (LCD) or an organic light emitting diode (OLED) display. The electronic display 12 may receive image data 48 for display. The electronic display 12 uses the driver circuitry 30 that includes scan driver 50 and data driver 52 to program the image data 48 onto display pixels 54. The electronic display 12 may include a display panel 32 having the display pixels 54 disposed hereon. The electronic display 12 may also include power supply circuitry 34 that provides one or more supply voltages to the display pixels 54.

The display pixels 54 may each represent a liquid crystal (LC) cell to filter certain colors of light in various brightness levels from a backlight (not shown) or may contain one or more self-emissive elements, such as a light-emitting diodes (LEDs) (e.g., organic light emitting diodes (OLEDs) or micro-LEDs (μLEDs)). The display pixels 54 may also represent pixels of digital mirror devices (DMD) or other suitable display devices that may use pixel grouping. In any event, different display pixels 54 may emit different colors (e.g., red, green, blue (RGB)). For example, some of the display pixels 54 may emit red light, some may emit green light, and some may emit blue light. Thus, the display pixels 54 may be driven to emit light at different brightness levels to cause a user viewing the electronic display 12 to perceive an image formed from different colors of light. The display pixels 54 may also correspond to hue and/or luminance levels of a color to be emitted and/or to other color combinations, such as combinations that use cyan, magenta, and yellow (CMY), or others.

The scan driver 50 may provide scan signals (e.g., pixel reset, data enable, on-bias stress) on scan lines 56 to control the display pixels 54 by row. For example, the scan driver 50 may cause one or more selected rows of the display pixels 54 to become enabled to receive a portion of the image data 48 from data lines 58 from the data driver 52. In this way, an image frame of image data 48 may be programmed onto the display pixels 54 row by row or selected groups of rows.

Figure 7:
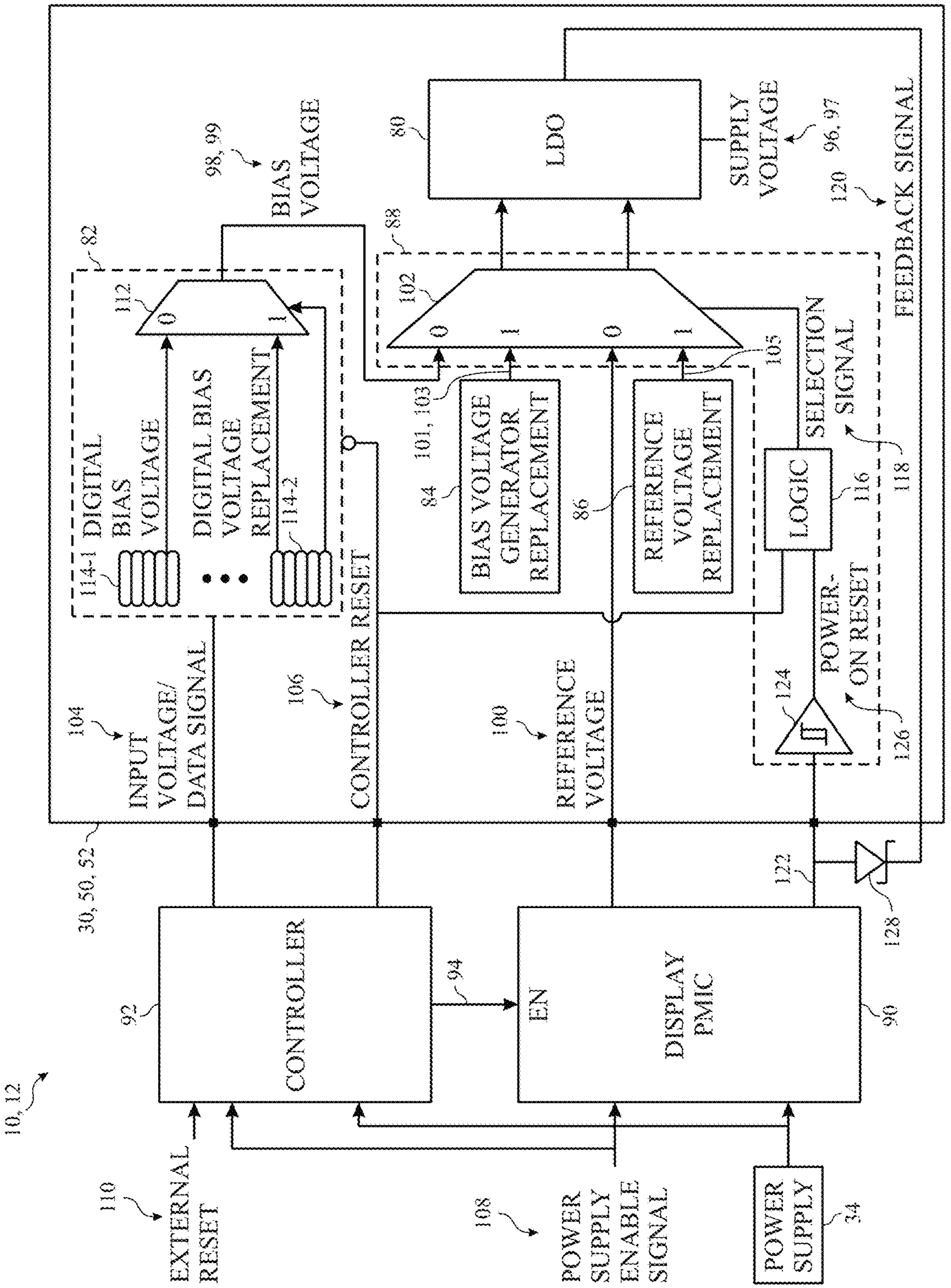
FIG. 7 is a block diagram of a portion of the display driver circuitry of FIGS. 1-6 including a hard park mode voltage replacement scheme, according to embodiments of the present disclosure.

FIG. 7 is a block diagram of a portion of the driver circuitry 30 of the display panel 32 including a hard park mode voltage replacement scheme, in accordance with some embodiments of the present disclosure. The depicted portion of the driver circuitry 30 may include a first LDO 80, a first bias voltage generator circuit 82, a bias voltage generator replacement circuit 84, a reference voltage replacement circuit 86, and a selection circuit 88. For example, the depicted driver circuitry 30 may correspond to at least a portion of circuitry of the scan driver 50 and/or a portion of circuitry of the data driver 52. The driver circuitry 30 may be coupled to a power management integrated circuit (PMIC) 90, a controller 92, and the power supply circuitry 34. In some embodiments, the processor core complex 18 described above may include or may be coupled to the power management integrated circuit 90 and/or the controller 92. Moreover, the power management integrated circuit 90 and the power supply circuitry 34 may be collectively referred to as the power supply circuit. Moreover, in specific cases, the controller 92 may enable operations of the power management integrated circuit 90 via an enable signal 94.

In different embodiments, the first LDO 80 may operate in a normal mode to generate a positive supply voltage 96 or a negative supply voltage 97. The first LDO 80 may generate the positive supply voltage 96 in response to receiving a positive bias voltage 98 and a reference voltage 100. Moreover, the first LDO 80 may generate the negative supply voltage 97 in response to receiving a negative bias voltage 99 and the reference voltage 100. The first bias voltage generator circuit 82 may output the positive bias voltage 98 or the negative bias voltage 99. The power management integrated circuit 90 may output the reference voltage 100. It should be appreciated that in alternative or additional embodiments, alternative or additional circuits may generate and/or provide the positive bias voltage 98, the negative bias voltage 99, and the reference voltage 100.

In any case, the first LDO 80 may output the positive supply voltage 96 or the negative supply voltage 97 to the display pixels 54 of the display panel 32 discussed above. Moreover, the first LDO 80 may receive the positive bias voltage 98 (or the negative bias voltage 99) and the reference voltage 100 via a multiplexer 102 of the selection circuit 88 in a first state of the driver circuitry 30. In some cases, the multiplexer 102 may provide replacement voltages to the first LDO 80 instead of the positive bias voltage 98 (or the negative bias voltage 99) and the reference voltage 100 in a second state of the driver circuitry 30, as will be appreciated. It should be appreciated that in alternative or additional embodiments, the driver circuitry 30 may include additional or alternative circuitry to provide the positive bias voltage 98 (or the negative bias voltage 99) and the reference voltage 100 to the first LDO 80 in the first state and provide the replacement voltages to the first LDO 80 in the second state.

In the depicted embodiment, the controller 92 may be coupled to the first bias voltage generator circuit 82. For example, the controller 92 may include a microcontroller and/or a timing controller to output input voltage and data signals 104 and controller reset signal 106 to the first bias voltage generator circuit 82. The controller 92 may generate the input voltage and data signals 104 based on receiving a power supply enable signal 108 and/or control signals indicative of the data signals. Moreover, the controller 92 may generate the controller reset signal 106 based on receiving an external reset signal 110 and/or receiving an input voltage outside of an acceptable range, among other things. For example, the controller 92 may generate the controller reset signal 106 based on determining that a positive supply voltage (e.g., the input voltage) received from the power supply circuitry 34 is below a threshold and/or a negative supply voltage (e.g., the input voltage) received from the power supply circuitry 34 is above a threshold.

The first bias voltage generator circuit 82 is coupled to a first input port of the multiplexer 102. The first bias voltage generator circuit 82 may output the positive bias voltage 98 (or the negative bias voltage 99) to the first input port of the multiplexer 102 based on receiving the input voltage and data signals 104. For example, the input voltage may have an amplitude and/or may be supplied with sufficient current for generating the positive bias voltage 98 (or the negative bias voltage 99) with a desired voltage level. Moreover, the data signals (e.g., the control signals) may be indicative of the desired voltage level of the positive bias voltage 98 (or the negative bias voltage 99).

The first bias voltage generator circuit 82 may include programmable and/or hardened circuitry to select or generate the positive bias voltage 98 (or the negative bias voltage 99) based on the data signals (e.g., the control signals). In particular, the first bias voltage generator circuit 82 may include a multiplexer 112 coupled to a digital bias voltage generator 114-1 and a digital bias voltage generator replacement 114-2. A first input port of the multiplexer 112 is coupled to the digital bias voltage generator 114-1 and a second input port of the multiplexer 112 is coupled to the digital bias voltage generator replacement 114-2.

The first bias voltage generator circuit 82 may select the first input port or the second input port based on the data signals. In some cases, the data signals may indicate selecting the digital bias voltage generator 114-1 when the input voltage is lower than a high voltage threshold and/or is higher than a low voltage threshold. In specific cases, the high voltage threshold and/or the low voltage threshold may correspond to a desired input voltage range of the first LDO 80. Moreover, the digital bias voltage generator 114-1 may output the positive bias voltage 98 (or the negative bias voltage 99) with different voltage levels based on the data signals. For example, the data signals may be indicative of selecting a higher/lower voltage level within the desired input voltage range of the first LDO 80 in response to a reduced/increased voltage level of the input voltage.

Moreover, the data signals may indicate selecting the digital bias voltage generator replacement 114-2 when the input voltage is equal to or outside the high voltage threshold and/or the low voltage threshold. For example, the digital bias voltage generator replacement 114-2 may output the positive bias voltage 98 (or the negative bias voltage 99) with voltage levels corresponding to a soft park mode of the first LDO 80. In such cases, the first LDO 80 may generate and output a low power output signal, an output signal with low voltage level, a standby voltage, among other things.

In some embodiments, the controller reset signal 106 may cause the first bias voltage generator circuit 82 to operate at a standby mode, a shutdown mode, and/or an idle mode. For example, the first LDO 80 outputs a low positive supply voltage 96 or negative supply voltage 97 (e.g., near zero volts) in idle mode. The controller reset signal 106 may also cause the multiplexer 102 to provide replacement voltages to the first LDO 80 instead of the positive bias voltage 98 (or the negative bias voltage 99) and the reference voltage 100, as will be appreciated.

In any case, the power management integrated circuit 90 is coupled to a second input port of the multiplexer 102. The power management integrated circuit 90 may output the reference voltage 100 to the second input port of the multiplexer 102. Moreover, the multiplexer 102 may provide the positive bias voltage 98 (or the negative bias voltage 99) and the reference voltage 100 to the first LDO 80 during the normal mode and soft park mode operation of the first LDO 80. For example, the driver circuitry 30 may be in a first state when the multiplexer 102 provides the positive bias voltage 98 (or the negative bias voltage 99) and the reference voltage 100 to the first LDO 80 during the normal mode and soft park mode operation of the first LDO 80.

With the foregoing in mind, a logic circuit 116 of the selection circuit 88 may provide a selection signal 118 to the multiplexer 102 to switch operation of the first LDO 80 to a hard park mode. In particular, the multiplexer 102 may output the input signals of a third input port and a fourth input port to input ports of the first LDO 80 in response to receiving the selection signal 118 to switch operation of the first LDO 80 to the hard park mode. As such, the multiplexer 102 may output the input signals of the third input port and the fourth input port instead of outputting the input signals of the first input port and the second input port to the first LDO 80.

The third input port is coupled to the bias voltage generator replacement circuit 84. The fourth input port is coupled to the reference voltage replacement circuit 86. Moreover, the logic circuit 116 may provide the selection signal 118 based on receiving the controller reset signal 106 of the controller 92, a feedback signal 120 of the first LDO 80, and/or a trigger signal 122 of the power management integrated circuit 90. The bias voltage generator replacement circuit 84 may include circuitry to output a voltage below a threshold for biasing the first LDO 80 to switch operations of the first LDO 80 to the hard park mode. Similarly, the reference voltage replacement circuit 86 may include circuitry to provide a voltage below a threshold voltage of the reference voltage of the first LDO 80 to switch operations of the first LDO 80 to the hard park mode. For example, the bias voltage generator replacement circuit 84 may output a negative voltage when generating the positive supply voltage 96 or a positive voltage when generating the negative supply voltage 97. The bias voltage generator replacement circuit 84 and the reference voltage replacement circuit 86 may be dedicated circuits for generating a hard park mode positive bias voltage 101 (or a hard park mode negative bias voltage 103) and a hard park mode reference voltage 105 respectively.

In some embodiments, the bias voltage generator replacement circuit 84 and/or the reference voltage replacement circuit 86 may each include hardened and/or programmable logic circuits. Moreover, each of the bias voltage generator replacement circuit 84 and/or the reference voltage replacement circuit 86 may be programmed and/or implemented during manufacturing and/or after manufacturing by the processor core complex 18, among other possibilities. In some embodiment, the first LDO 80 may be turned off (e.g., effectively turned off, nearly turned off) with high output impedance when in the hard park mode.

In any case, the bias voltage generator replacement circuit 84 may output the hard park mode positive bias voltage 101 (or the hard park mode negative bias voltage 103) to the bias voltage input of the first LDO 80. Moreover, the reference voltage replacement circuit 86 may output the hard park mode reference voltage 105 to the reference voltage input of the first LDO 80. For example, the driver circuitry 30 may be in a second state when the multiplexer 102 provides the hard park mode positive bias voltage 101 (or the hard park mode negative bias voltage 103) and the hard park mode reference voltage 105 to the first LDO 80 during the hard park mode operation of the first LDO 80.

As mentioned above, the logic circuit 116 may output the selection signal 118 to cause outputting the input signals of the third input port and the fourth input port of the multiplexer 102 to input ports of the first LDO 80. The logic circuit 116 may output the selection signal 118 in response to receiving the controller reset signal 106 discussed above, the feedback signal 120, and/or the trigger signal 122.

In some embodiments, the driver circuitry 30 may include the first LDO 80 to generate the positive supply voltage 96 when receiving the positive bias voltage 98 and a second LDO to generate the negative supply voltage 97 when receiving the negative bias voltage 99. As mentioned above, in alternative embodiments, the driver circuitry 30 may include circuitry, such as the first LDO 80 and a second LDO, to generate the negative supply voltage 97 based on receiving the negative bias voltage 99 and generate the positive supply voltage 96 based on receiving the positive bias voltage 98. For example, the first LDO 80 and the second LDO may be coupled to or otherwise be associated with similar bias voltage generator circuits (e.g., similar to the first bias voltage generator circuit 82), similar selection circuits including multiplexers (e.g., the selection circuit 88 including the multiplexer 102), similar bias voltage generator replacement circuits (e.g., similar to the bias voltage generator replacement circuit 84), and similar reference voltage replacement circuits (e.g., similar to the reference voltage replacement circuit 86). Moreover, the power management integrated circuit 90 may provide the reference voltage 100 to the first LDO 80 and the second LDO (e.g., to the multiplexers of the first LDO 80 and the second LDO). Accordingly, the first LDO 80 may generate the positive supply voltage 96 when receiving a positive bias voltage 98 and the second LDO may generate the negative supply voltage 97 when receiving a negative bias voltage 99, as will be appreciated.

In the depicted embodiment, the selection circuit 88 may include a comparator circuit 124 (e.g., a comparator, an amplifier, among other things) to receive the feedback signal 120 and/or the trigger signal 122 of the power management integrated circuit 90. In some cases, the comparator circuit 124 may detect whether a rapid and/or potentially deleterious change has occurred. For example, the power management integrated circuit 90 may generate the trigger signal 122 in response to detecting that a positive supply voltage (e.g., the input voltage) of the power supply circuitry 34 is below a threshold, a negative supply voltage (e.g., the input voltage) of the power supply circuitry 34 is above a threshold, or either of the positive supply voltage and the negative supply voltage are fluctuating above a threshold voltage, among other possibilities.

Moreover, the first LDO 80 may output the feedback signal 120 corresponding to an amplitude of the supply voltage 96. In some cases, the comparator circuit 124 may compare (e.g., using the comparator circuit 124) the feedback signal 120 with one or more threshold values. The selection circuit 88 may couple the third input port (e.g., the bias voltage generator replacement circuit 84) and the fourth input port (e.g., the reference voltage replacement circuit 86) of the multiplexer 102 to the first LDO 80 in response to the feedback signal 120 being above a threshold and/or below a threshold and/or otherwise fluctuating above a threshold voltage. In some cases, the selection circuit 88 (e.g., using the comparator circuit 124) may also couple the third input port and the fourth input port of the multiplexer 102 to the first LDO 80 in response to detecting fluctuations of the feedback signal 120 higher than a threshold, fluctuations of the reference voltage 100, or both.

As such, the comparator circuit 124 may output a power-on reset signal 126 to a logic circuit 116 based on detecting power supply disruptions of the power management integrated circuit 90 and/or the first LDO 80. The logic circuit 116 may also receive the controller reset signal 106. As mentioned above, the controller 92 may generate the controller reset signal 106 based on receiving the external reset signal 110 and/or receiving the input voltage outside of the acceptable range, among other things. For example, the controller 92 may determine whether the supply voltage (e.g., the input voltage) associated with the power supply circuitry 34 is above a threshold and/or below a threshold. As mentioned above, the depicted portion of the driver circuitry 30 may generate the positive supply voltage 96 or the negative supply voltage 97. Accordingly, the selection circuit 88 may also couple the third input port and the fourth input port of the multiplexer 102 to the first LDO 80 based on receiving the external reset signal 110, timing error detected by the timing controller of the controller 92, and/or the supply voltage (e.g., the input voltage) being above a threshold and/or below a threshold, among other things.

The logic circuit 116 may output the selection signal 118 indicative of switching operations of the first LDO 80 to the hard park mode in response to receiving the power-on reset signal 126, the controller reset signal 106, or both. For example, the logic circuit 116 may include an exclusive OR gate (XOR gate) or any other viable circuit components. As such, the logic circuit 116 may couple and uncouple the third input port and the fourth input port to the first LDO 80 by providing and removing the selection signal 118. With the foregoing in mind, it should be appreciated that the depicted embodiment is by the way of example and in alternative or additional embodiments, the selection circuit 88 may receive additional and/or alternative signals to generate the selection signal 118. Moreover, in different embodiments, the selection circuit 88 may generate the selection signal 118 by generating a logic high or logic low signal.

Moreover, the selection circuit 88, the comparator circuit 124 of the selection circuit 88, a path of the feedback signal 120, among other things, may include additional components. For example, the path of the feedback signal 120 may include a Schottky diode 128 to reduce an effect of output transient signals of the first LDO 80. Furthermore, although the feedback signal 120, the trigger signal, and the controller reset signal 106 are described as being above a threshold (e.g., high voltage) to switch the first LDO 80 to the hard park mode, in alternative or additional embodiments, any other viable voltage scheme may be used. For example, in alternative or additional cases, the feedback signal 120, the trigger signal, and the controller reset signal 106 may become low to switch the first LDO 80 to the hard park mode.

With the foregoing in mind, the driver circuitry 30 may de-energizing the first LDO 80 with improved efficiency when using the bias voltage generator replacement circuit 84 and the reference voltage replacement circuit 86. In particular, the driver circuitry 30 may de-energize the first LDO 80 at a higher rate or a slower rate in different applications with improved efficiency when switching to the hard park mode (e.g., the second state). Moreover, the comparator circuit 124, the logic circuit 116, the controller 92, the power management integrated circuit 90, or a combination thereof may be programmed to switch to the hard park mode (e.g., the second state) at different voltage threshold. As such, the driver circuitry 30 may operate in the hard park mode based on different voltage thresholds.

For example, the driver circuitry 30 may de-energize the first LDO 80 at a higher rate (e.g., immediate discharge) in response to receiving the external reset signal 110 and/or receiving the input voltage outside of the acceptable range, among other things. Moreover, the driver circuitry 30 may de-energize the first LDO 80 at a slower rate (e.g., slow discharge) by stepping down the input voltage by the soft park mode via the first bias voltage generator circuit 82 before switching to the hard park mode.

In such cases, the reference voltage replacement circuit 86 may output the hard park mode reference voltage 105 with reduced fluctuation and/or with a desired voltage level to de-energize the first LDO 80 more efficiently. As such, the operations of the driver circuitry 30 including the first LDO 80 may be improved by providing the hard park mode positive bias voltage 101 (or the hard park mode negative bias voltage 103) and the hard park mode reference voltage 105 to the first LDO 80. Moreover, providing the hard park mode positive bias voltage 101 (or the hard park mode negative bias voltage 103) and the hard park mode reference voltage 105 to the first LDO 80 may also improve reliability and/or power consumption efficiency of the first LDO 80 and/or the driver circuitry 30.

Figure 8:
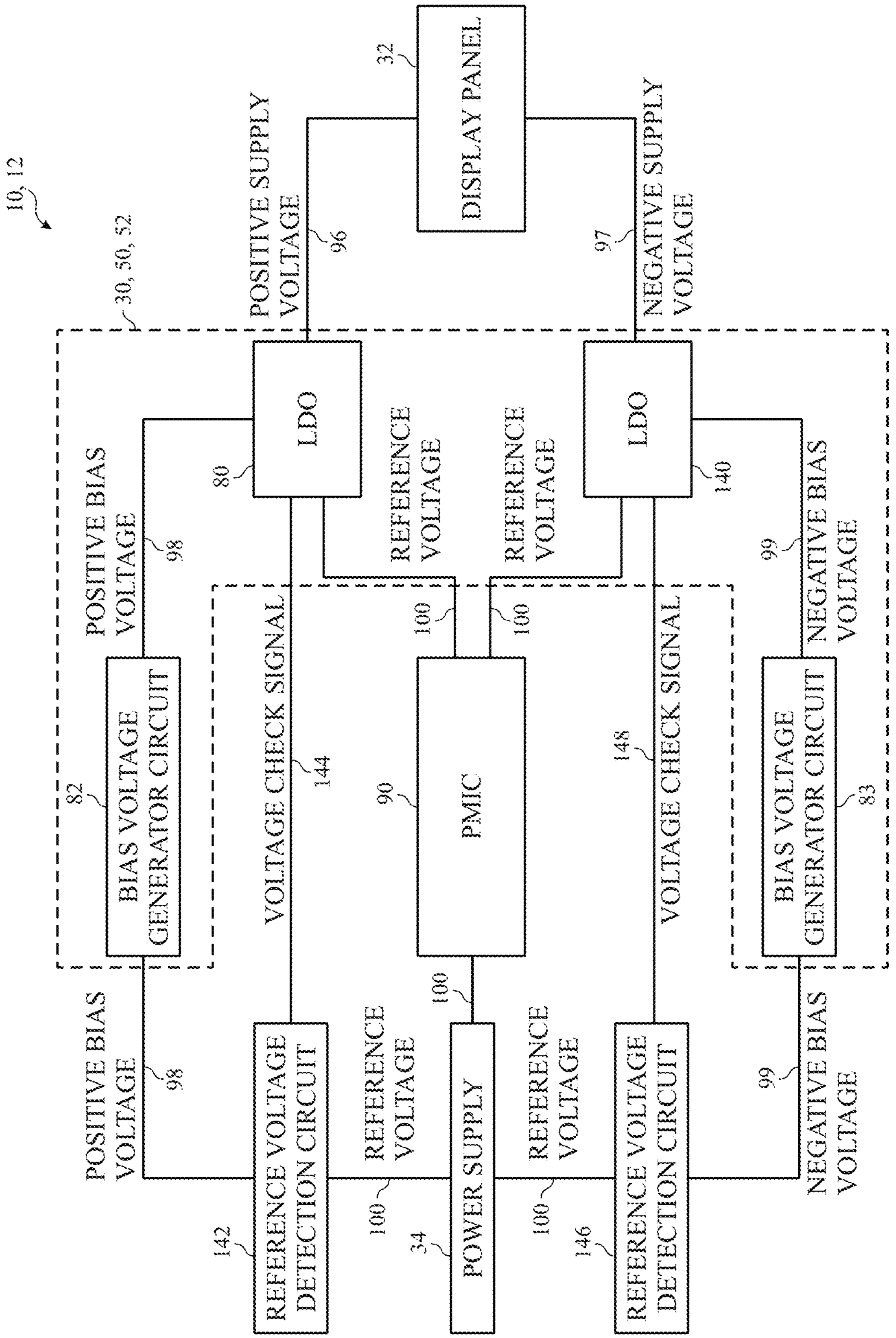
FIG. 8 is a block diagram of a portion of the display including the display driver circuitry and a reference voltage detection scheme, in accordance with some embodiments of the present disclosure.

FIG. 8 is a block diagram of a portion of the display 12 including a reference voltage detection scheme, in accordance with some embodiments of the present disclosure. The display 12 may include the power supply 34, the driver circuitry 30 including the first LDO 80 and a second LDO 140, and the display panel 32. The driver circuitry 30 may include the first bias voltage generator circuit 82 discussed above and a second bias voltage generator circuit 83. In different embodiments, the second bias voltage generator circuit 83 may include similar or different circuit components as compared to the first bias voltage generator circuit 82. In the depicted embodiment, the first bias voltage generator circuit 82 may generate the positive bias voltage 98 and the second bias voltage generator circuit 83 may generate the negative bias voltage 99. In alternative or additional embodiments, the power supply 34 may include the first bias voltage generator circuit 82, the second bias voltage generator circuit 83, or both.

In the depicted embodiment, the first LDO 80 may generate the positive supply voltage 96 when receiving the positive bias voltage 98. Moreover, the second LDO 140 may generate the negative supply voltage 97 when receiving the negative bias voltage 99. The first bias voltage generator circuit 82 (and/or the power supply 34) may output the positive bias voltage 98 to the first LDO 80. The second bias voltage generator circuit 83 (and/or the power supply 34) may output the negative bias voltage 99 to the second LDO 140. It should be appreciated that in alternative or additional embodiments, the first LDO 80 may generate the negative supply voltage 97 when receiving the negative bias voltage 99 and the second LDO 140 may generate the positive supply voltage 96 when receiving the positive bias voltage 98.

In any case, in the depicted embodiment, the display panel 32 may receive the positive supply voltage 96 from the first LDO 80 and the negative supply voltage 97 from the second LDO 140. In some embodiments, each of the first LDO 80 and the second LDO 140 of the driver circuitry 30 may include, may be coupled to, or otherwise may be associated with similar circuitry described above with respect to FIG. 7. For example, the display 12 may include the power management integrated circuit 90 to provide the reference voltage 100 to the first LDO 80 and the second LDO 140. In different embodiments, the power management integrated circuit 90 may include different components and/or logic circuitry. Moreover, the power supply 34 may be coupled to and provide the reference voltage 100 to the power management integrated circuit 90.

The display 12 may also include a first reference voltage detection circuit 142 and a second reference voltage detection circuit 146. The first reference voltage detection circuit 142 may be coupled to the power supply 34 and the first LDO 80. The first reference voltage detection circuit 142 may receive the reference voltage 100 and the positive bias voltage 98. In alternative or additional embodiments, the first reference voltage detection circuit 142 may be coupled to and/or receive the reference voltage 100 and the positive bias voltage 98 from the power management integrated circuit 90. In any case, the first reference voltage detection circuit 142 may generate a first voltage check signal 144 indicative of the reference voltage 100 and/or the positive bias voltage 98 having a desired voltage value. Moreover, the first LDO 80 may generate the positive supply voltage 96 based on receiving the first voltage check signal 144.

In some cases, the desired voltage values of the reference voltage 100 and the positive bias voltage 98 may be based on a desired differential voltage value between the reference voltage 100 and the positive bias voltage 98. For example, the desired differential voltage value may be lower than a first voltage threshold (e.g., a high voltage threshold) and/or below a second voltage threshold (e.g., a low voltage threshold). Additionally or alternatively, the desired voltage values of each of the reference voltage 100 and the positive bias voltage 98 may be separately defined. For example, the desired voltage value of the reference voltage 100 and/or the positive bias voltage 98 may be lower than respective voltage thresholds (e.g., a third voltage threshold, a high voltage threshold) and/or below respective voltage thresholds (e.g., a fourth voltage threshold, a low voltage threshold).

The first reference voltage detection circuit 142 may include any viable electronic components, logic circuits, processing circuits, or a combination thereof, to determine whether the reference voltage 100 and the positive bias voltage 98 have voltage values corresponding to the desired voltage values. For example, the first reference voltage detection circuit 142 may include a logic comparator for generating the first voltage check signal 144 based on comparing the reference voltage 100, the positive bias voltage 98, both, or a differential value thereof with one or more respective voltage thresholds.

The second reference voltage detection circuit 146 may be coupled to the power supply 34 and the second LDO 140. The second reference voltage detection circuit 146 may receive the reference voltage 100 and the negative bias voltage 99. In alternative or additional embodiments, the second reference voltage detection circuit 146 may be coupled to and/or receive the reference voltage 100 and the negative bias voltage 99 from the power management integrated circuit 90. In any case, the second reference voltage detection circuit 146 may generate a second voltage check signal 148 indicative of the reference voltage 100 and/or the negative bias voltage 99 having a desired voltage value. Moreover, the second LDO 140 may generate the negative supply voltage 97 based on receiving the second voltage check signal 148.

In some cases, the desired voltage values of the reference voltage 100 and the negative bias voltage 99 may be based on a desired differential voltage value between the reference voltage 100 and the negative bias voltage 99. For example, the desired differential voltage value may be lower than a first voltage threshold (e.g., a high voltage threshold) and/or below a second voltage threshold (e.g., a low voltage threshold). Additionally or alternatively, the desired voltage values of each of the reference voltage 100 and the negative bias voltage 99 may be separately defined. For example, the desired voltage value of the reference voltage 100 and/or the negative bias voltage 99 may be lower than respective voltage thresholds (e.g., a third voltage threshold, a high voltage threshold) and/or below respective voltage thresholds (e.g., a fourth voltage threshold, a low voltage threshold).

The second reference voltage detection circuit 146 may include any viable electronic components, logic circuits, processing circuits, or a combination thereof, to determine whether the reference voltage 100 and the negative bias voltage 99 have voltage values corresponding to the desired voltage values. For example, the second reference voltage detection circuit 146 may include a logic comparator for generating the second voltage check signal 148 based on comparing the reference voltage 100, the negative bias voltage 99, both, or a differential value thereof with one or more respective voltage thresholds.

As mentioned above, the first LDO 80 may generate the positive supply voltage 96 based on receiving the first voltage check signal 144. In some embodiments, the first LDO 80 may include (or be coupled to) circuitry to cause generating the positive supply voltage 96 based on receiving the first voltage check signal 144. For example, the first voltage check signal 144 (e.g., a logic high signal) may enable operations of the first LDO 80 based on receiving the positive bias voltage 98 and the reference voltage 100.

Similarly, the second LDO 140 may generate the negative supply voltage 97 based on receiving the second voltage check signal 148. In some embodiments, the second LDO 140 may include (or be coupled to) circuitry to cause generating the negative supply voltage 97 based on receiving the second voltage check signal 148. For example, the second voltage check signal 148 (e.g., a logic high signal) may enable operations of the second LDO 140 based on receiving the negative bias voltage 99 and the reference voltage 100.

Referring back to FIG. 7, in some embodiments, the first LDO 80 may be coupled to the bias voltage generator replacement circuit 84 and the reference voltage replacement circuit 86 via the multiplexer 102. In such cases, the logic circuit 116 may receive the first voltage check signal 144. Moreover, the logic circuit 116 may provide the selection signal 118 to the multiplexer 102 based on receiving the first voltage check signal 144. As such, the multiplexer 102 may couple the positive bias voltage 98 and the reference voltage 100 to the first LDO 80 when the logic circuit 116 receives the first voltage check signal 144 having a first value (e.g., a logic high signal).

The first value may be indicative of enabling the operations of the first LDO 80. Moreover, the multiplexer 102 may couple the bias voltage generator replacement circuit 84 and the reference voltage replacement circuit 86 to the first LDO 80 when the logic circuit 116 receives the first voltage check signal 144 having a second value (e.g., a logic low signal). The second value may be indicative of the positive bias voltage 98, the reference voltage 100, or both, or a differential value thereof, having a voltage value equal to or above a high voltage threshold and/or equal to or below a low voltage threshold.

As mentioned above, the second LDO 140 may also include, be coupled to, or otherwise be associated with similar circuitry described with respect to the second LDO 140. By the way of example, the second LDO 140 may be coupled to the bias voltage generator replacement circuit 84 and the reference voltage replacement circuit 86 via the multiplexer 102. The logic circuit 116 may receive the second voltage check signal 148. Moreover, the logic circuit 116 may provide the selection signal 118 to the multiplexer 102 based on receiving the second voltage check signal 148. As such, the multiplexer 102 may couple the negative bias voltage 99 and the reference voltage 100 to the second LDO 140 when the logic circuit 116 receives the second voltage check signal 148 having a third value (e.g., a logic high signal).

The third value may be indicative of enabling the operations of the second LDO 140. Moreover, the multiplexer 102 may couple the bias voltage generator replacement circuit 84 and the reference voltage replacement circuit 86 to the second LDO 140 when the logic circuit 116 receives the second voltage check signal 148 having a fourth value (e.g., a logic low signal). The fourth value may be indicative of the negative bias voltage 99, the reference voltage 100, or both, or a differential value thereof, having a voltage value equal to or above a high voltage threshold and/or equal to or below a low voltage threshold. Accordingly, the first reference voltage detection circuit 142 and the second reference voltage detection circuit 146 may improve reliability and/or power consumption efficiency of the first LDO 80, the second LDO 140, and/or the driver circuitry 30.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ," it is intended that such elements are to be interpreted under 35 U.S.C. 112(f). However, for any claims containing elements designated in any other manner, it is intended that such elements are not to be interpreted under 35 U.S.C. 112(f).

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The invention claimed is:

1. A display driver comprising:

a low drop-out regulator configured to output a supply voltage;

a multiplexer configured to provide a bias voltage and a reference voltage to the low drop-out regulator in a first state and provide a hard park mode bias voltage and a hard park mode reference voltage to the low drop-out regulator in a second state, wherein the multiplexer is configured to operate at the second state to provide the hard park mode bias voltage and the hard park mode reference voltage to the low drop-out regulator in response to receiving a selection signal;

a bias voltage generator circuit coupled to the multiplexer, wherein the bias voltage generator circuit is configured to output the bias voltage to the multiplexer;

a bias voltage generator replacement circuit coupled to the multiplexer, wherein the bias voltage generator replacement circuit is configured to output the hard park mode bias voltage to the multiplexer;

a reference voltage replacement circuit coupled to the multiplexer, wherein the reference voltage replacement circuit is configured to output the hard park mode reference voltage to the multiplexer; and a selection circuit coupled to the low drop-out regulator and the multiplexer, wherein the selection circuit is configured to:

receive a feedback signal from the low drop-out regulator, wherein the feedback signal corresponds to a voltage amplitude of the supply voltage;

determine whether the feedback signal is equal to or above a high threshold or equal to or below a low threshold; and provide the selection signal indicative of operation in the second state to the multiplexer.

2. The display driver of claim 1, comprising a reference voltage detection circuit configured to receive the bias voltage and the reference voltage, wherein the reference voltage detection circuit is configured to generate a voltage check signal in response to the bias voltage, the reference voltage, or a differential value of the bias voltage and the reference voltage comprises a voltage value above a first threshold or below a second threshold, wherein the low drop-out regulator configured to output the supply voltage in response to receiving the voltage check signal.

3. The display driver of claim 1, wherein the bias voltage generator circuit comprises a digital bias voltage generator and a digital bias voltage generator replacement.

4. The display driver of claim 3, wherein the bias voltage generator circuit is configured to output the bias voltage by coupling the digital bias voltage generator or the digital bias voltage generator replacement to the multiplexer based on receiving a control signal.

5. The display driver of claim 1, wherein the bias voltage generator replacement circuit comprises hardened logic circuit configured to generate the hard park mode bias voltage.

6. The display driver of claim 1, wherein the bias voltage generator replacement circuit comprises programmable logic circuit configured to generate the hard park mode bias voltage.

7. The display driver of claim 1, wherein the reference voltage replacement circuit comprises hardened logic circuit configured to generate the hard park mode reference voltage.

8. The display driver of claim 1, wherein the reference voltage replacement circuit comprises programmable logic circuit configured to generate the hard park mode reference voltage.

9. An electronic display circuit comprising:

a power management integrated circuit configured to output a reference voltage and a trigger signal;

a display panel comprising a plurality of display pixels; and a display driver coupled to the display panel, wherein the display panel comprises:

a low drop-out regulator configured to output a supply voltage to at least one display pixel of the plurality of display pixels and output a feedback signal indicative of a voltage level of the supply voltage;

a bias voltage generator circuit configured to output a bias voltage based on receiving an input voltage;

a bias voltage generator replacement circuit configured to output a first bias voltage;

a reference voltage generator replacement circuit configured to output a second reference voltage; and a selection circuit coupled to the low drop-out regulator, the bias voltage generator circuit, the bias voltage generator replacement circuit, and the reference voltage generator replacement circuit, wherein the selection circuit is configured to output the bias voltage and the reference voltage to input ports of low drop-out regulator in response to determining that the feedback signal is below a high threshold, above a low threshold, or both, and output the first bias voltage and the second reference voltage to the input ports of the low drop-out regulator in response to receiving the trigger signal.

10. The electronic display circuit of claim 9, wherein the bias voltage generator circuit is configured to output the bias voltage with a voltage level corresponding to a normal mode operation of the low drop-out regulator and a voltage level corresponding to a soft park mode operation of the low drop-out regulator.

11. The electronic display circuit of claim 10, wherein the low drop-out regulator outputs a low supply voltage during the soft park mode operation.

12. The electronic display circuit of claim 9, comprising a controller configured to output the input voltage to the bias voltage generator circuit and output a controller reset signal to the selection circuit, wherein the selection circuit outputs the first bias voltage and the second reference voltage to the input ports of the low drop-out regulator in response to receiving the controller reset signal.

13. An electronic device comprising:

a power supply circuit configured to output an input voltage and a reference voltage; and an electronic display circuit coupled to the power supply circuit, wherein the electronic display circuit comprises:

a display panel comprising a plurality of display pixels;

a display driver coupled to the display panel, wherein the display driver comprises:

a low drop-out regulator coupled to at least one display pixel of the plurality of display pixels, wherein the low drop-out regulator is configured to output a supply voltage to the at least one display pixel;

a multiplexer coupled to input ports of the low drop-out regulator and the power supply circuit to receive the reference voltage;

a bias voltage generator circuit coupled to the power supply circuit and the multiplexer, wherein the bias voltage generator circuit is configured to output a bias voltage based on receiving the input voltage;

a bias voltage replacement circuit coupled to the multiplexer, wherein the bias voltage replacement circuit is configured to generate a hard park mode bias voltage; and a reference voltage replacement circuit coupled to the multiplexer, wherein the reference voltage replacement circuit is configured to generate a hard park mode reference voltage;

wherein the multiplexer is configured to:

couple the bias voltage generator circuit and the power supply circuit to the input ports of the low drop-out regulator in response to a selection signal corresponding to a voltage level of the supply voltage being below a high threshold, above a low threshold, or both; and couple the bias voltage replacement circuit and the reference voltage replacement circuit to the input ports of the low drop-out regulator in response to the selection signal corresponding to the voltage level of the supply voltage being equal to or above the high threshold, equal to or below the low threshold, or both.

14. The electronic device of claim 13, wherein the bias voltage generator circuit is configured to generate the bias voltage with a voltage level based on receiving control signals indicative of the voltage level.

15. The electronic device of claim 13, wherein the display driver comprises a selection circuit coupled to the low drop-out regulator, the multiplexer, and the power supply circuit.

16. The electronic device of claim 15, wherein the selection circuit is configured to output the selection signal to the multiplexer based on receiving a feedback signal from the low drop-out regulator, wherein the feedback signal corresponds to the voltage level of the supply voltage.

17. The electronic device of claim 13, wherein the bias voltage replacement circuit is configured to generate the hard park mode bias voltage having a voltage level associated with shutting down the low drop-out regulator.

18. The electronic display circuit of claim 9, comprising a multiplexer configured to provide the bias voltage and the reference voltage to the low drop-out regulator in a first state and provide the first bias voltage and the second reference voltage to the low drop-out regulator in a second state.

19. The electronic display circuit of claim 9, wherein the selection circuit is configured to output the first bias voltage and the second reference voltage to the input ports of the low drop-out regulator in response to determining that the feedback signal is equal to or above the high threshold or equal to or below the low threshold.

20. The electronic device of claim 13, comprising a reference voltage detection circuit configured to receive the bias voltage and the reference voltage, wherein the reference voltage detection circuit is configured to generate a voltage check signal in response to the bias voltage, the reference voltage, or a differential value of the bias voltage and the reference voltage comprises a voltage value above a first threshold or below a second threshold, wherein the low drop-out regulator configured to output the supply voltage in response to receiving the voltage check signal.

* * * * *